United States Patent [19]

Egelandsdal et al.

[11] Patent Number: 5,330,514

[45] Date of Patent: Jul. 19, 1994

[54] DUMMY FOR PRACTICING CARDIOPULMONARY RESUSCITATION (CPR) OF A HUMAN BEING

[75] Inventors: Einar Egelandsdal, Forus, Norway; Geoffrey C. Garth, Long Beach; John Hamilton, Torrance, both of Calif.; David Johnson, Hopewell Junction, N.Y.; Tore Laerdal, Gausel, Norway; Charles A. Patterson, Westminster, Calif.

[73] Assignee: Asmund S. Laerdal A/S, Stavanger, Norway

[21] Appl. No.: 920,711

[22] Filed: Jul. 28, 1992

[30] Foreign Application Priority Data

Jan. 23, 1992 [DE] Fed. Rep. of Germany ....... 4201768

[51] Int. Cl.$^5$ ............................................. G09B 23/28
[52] U.S. Cl. .................................................... 434/265
[58] Field of Search ......................... 434/262, 265, 266

[56] References Cited

U.S. PATENT DOCUMENTS

| 3,199,225 | 8/1965 | Robertson | 434/265 |
| 3,209,469 | 10/1965 | James | 434/265 |
| 3,562,925 | 2/1971 | Baermann et al. | 434/265 |
| 3,872,609 | 3/1975 | Smroka | 434/265 |
| 3,994,075 | 11/1976 | Ohnke et al. | |
| 4,984,987 | 1/1991 | Brault et al. | 434/265 |
| 5,195,896 | 3/1993 | Sweeney et al. | 434/265 |

OTHER PUBLICATIONS

Simulaids, Inc., Woodstock, N.Y., Adult CPR Training Manikin No. 2000: Instructions For Use, Care and Maintenance, 8 pp.

Life Form, Inc., Life/Form's Cparlene TM Simulators, Instruction Manual, 11 pp.

Actar 911 Squadron TM, Actar 911 Patrol TM, Actar 911 Trooper TM brochure, 8 pp. by Actar Airforce Inc., Toronto, Ontario, Can.

Ambu International A/S, Glostrup, Denmark: Description of Ambu System, 5 pp.

Medical Plastics Laboratory, Inc., Gatesville, Tex., Mar. 17, 1987, Crash Kelly CPR System, 7 pp.

Ambu International A/S, Glostrup, Denmark: Directions for use of the Ambu ® Man, The CPR simulator with the hygienic system, 23 pp.

Ambu International A/S, Glostrup, Denmark: Ambu ® Simulator II Training and Monitoring Equipment, 11 pp.

Primary Examiner—Gene Mancene
Assistant Examiner—Jeffrey A. Smith
Attorney, Agent, or Firm—Kenyon & Kenyon

[57] ABSTRACT

A dummy for practicing cardiopulmonary resuscitation (CPR) of a human being comprising a simulation of the thorax and the head and a lungs simulation in the form of a bag which can be inflated through the mouth or nose opening of the head. The thorax is formed by a hollow body of plastic material, which is in air exchange relationship with the atmosphere and which has stiffening ribs which reproduce approximately human ribs. In that arrangement the number and size of the stiffening ribs are so selected that the compressibility and return force of the thorax correspond to those of a human thorax not only in regard to extent but also in terms of their nature and form, and thus provide a particularly good approximation to the behavior of a human thorax (FIG. 1).

2 Claims, 10 Drawing Sheets

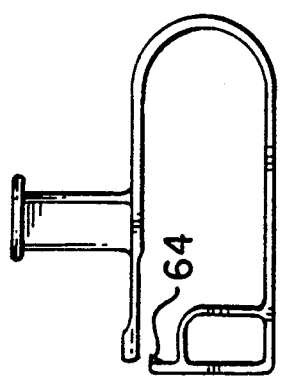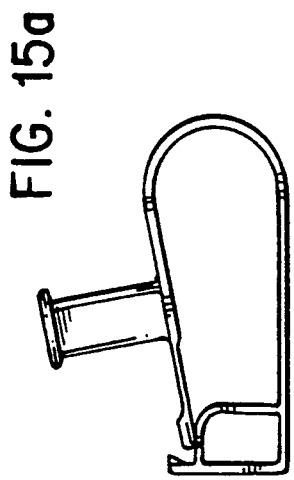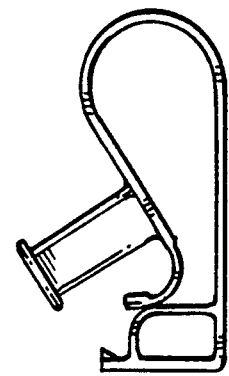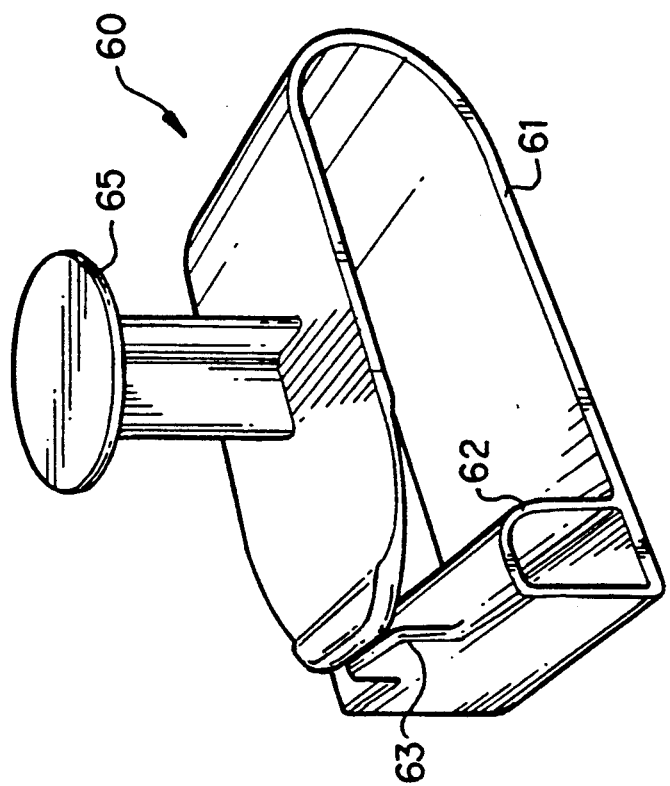

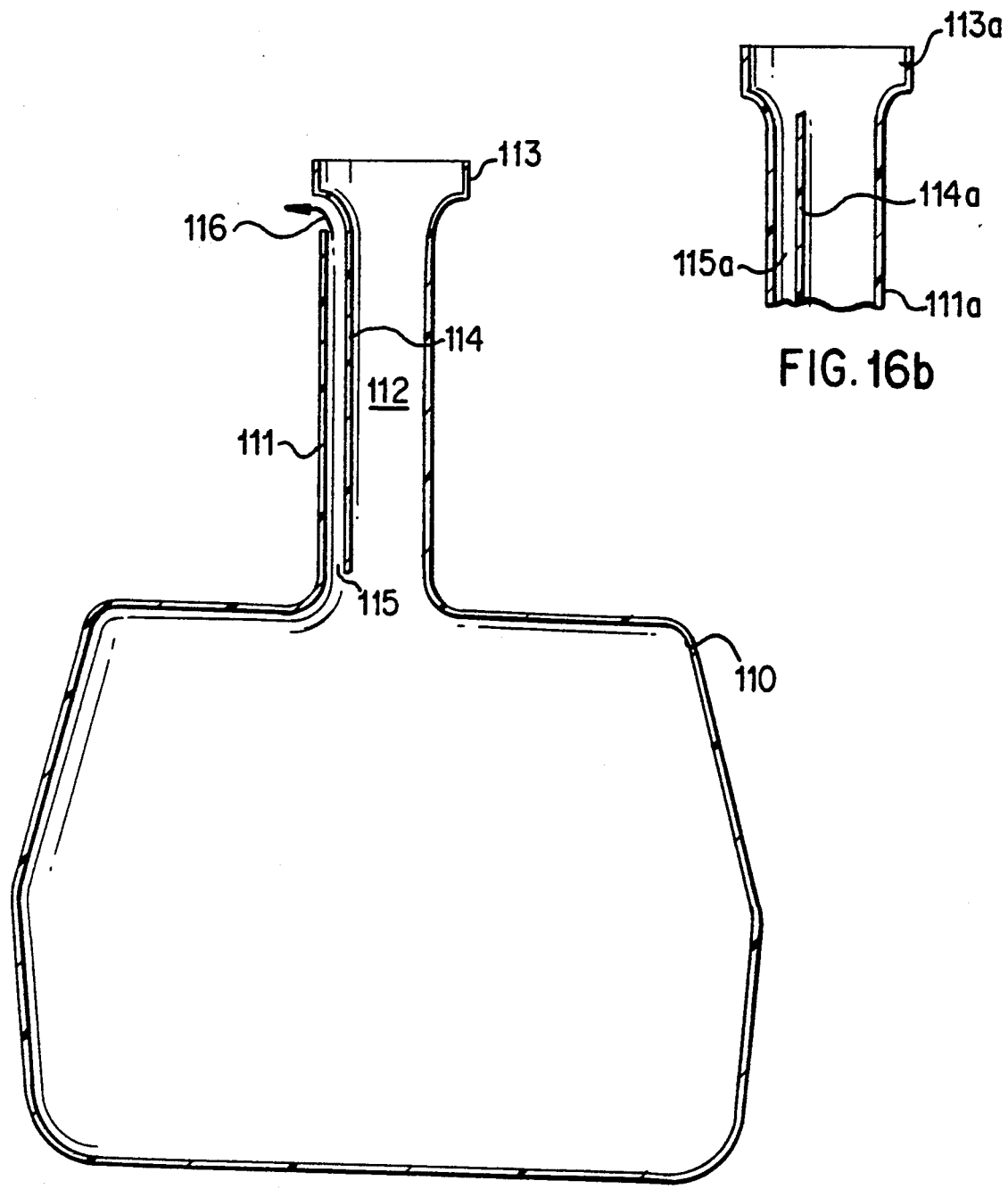

DUMMY FOR PRACTICING CARDIOPULMONARY RESUSCITATION (CPR) OF A HUMAN BEING

FIELD OF THE INVENTION

The invention relates to a dummy for practicing cardiopulmonary resuscitation (CPR) of a human being.

BACKGROUND OF THE INVENTION

Satisfactory mastery of cardiopulmonary resuscitation (CPR) presupposes adequate training and frequent practice. For that purpose, many forms of dummies are known, which simulate the human upper body including head, to a greater or lesser degree, and which include a lungs simulation which can be the subject of artificial respiration through a mouth and/or nose opening. A significant factor in that respect is that the dummy behaves in a realistic fashion, both in heart massage and also in artificial respiration, that is to say it opposes a resistance to the compression to be performed in effecting heart massage, and experiences a deformation effect which substantially corresponds to the human thorax, while giving expansion of the thorax when artificial respiration is applied which substantially simulates thorax expansion when the lungs of a human being are filled. It is only when the dummy is fashioned to substantially simulate the behavior of the human body that cardiopulmonary resuscitation on such a dummy can be correlated to correct performance in an emergency situation on a human being, for example an accident casualty.

Numerous dummies for learning and practicing CPR are known, which, in a simulation of the human thorax, contain a resilient return element in the form of one or more springs or a pneumatic cylinder, wherein the resilient return element serves for simulation of the resistance which occurs when heart compression is effected, and for returning the thorax to its initial position. In such dummies the lungs are simulated by an inflatable bag which is communicated with the mouth or nose opening of the head by way of a trachea simulation.

A dummy is also already known in which the thorax is formed by an air-tight container which retains its shape and which at the same time forms the lungs and for that purpose is communicated with the mouth or nose opening of the head by way of a trachea simulation. In that arrangement the container is so designed that it simulates the thorax expansion which occurs upon artificial respiration by virtue of a resilient change in its shape, while also corresponding to the compression resistance of a human thorax when heart massage is performed (German patent specification No. 2 543 671).

Just like the dummies referred to in the opening part of this specification, in which the thorax resistance is produced by mechanical or pneumatic springs, that known dummy also only provides a compromise, in terms of the behavior of the thorax in heart massage and in artificial respiration, because the air pressure which obtains in the interior of the air-tight container is substantially determined by the resistance which occurs in heart massage, and the deformation characteristics involved. In that respect the container differs from the deformation characteristics of the human thorax in regard to its expansion characteristics when being inflated.

SUMMARY OF THE INVENTION

The primary object of the present invention is that of providing a dummy for learning and practicing CPR, which, without involving major technical expenditure, that is to say with a very simple configuration, provides for a function which greatly approaches the behavior of the human body, in heart massage and artificial respiration. This object and other objects of the invention are attained by the features of the invention as described herein.

In that respect the invention is based on the consideration that it is not only the extent of the deformation and compression resistance of the thorax in heart massage that are of significance, but also the nature and form of the deformation of the thorax represent a characteristic which should be approached as realistically as possible by the CPR dummy. For that reason the invention aims to provide features by virtue of the choice of the shape and the wall thickness of the hollow body which simulates the thorax. Particularly, the hollow body is designed so that it approximates the rib cage of the human upper body, not only in regard to its deformation resistance but also in regard to the nature of its deformation. For it is only in that way that the trainee acquires the feeling that the position of his or her hands is possibly not entirely correct with regard to the heart massage operation.

In certain embodiments of the present invention the hollow body simulating the thorax in the dummy is produced by a blow molding procedure. As a preferred configuration, stiffening ribs may be formed or molded in the shape of ridges or beads on the wall of the hollow body, which substantially simulate the human rib cage. In that arrangement the rib stiffness can be fairly accurately established by suitable dimensioning (depth and width) of the ridges or beads, to approximate to a human rib cage.

The invention is further based on the consideration that realistic simulation of the chest lifting movement when artificial respiration is effected presupposes the retention of the per se known lungs simulation by means of a flat bag. However, in order to be able to embody a realistic chest lifting movement, without adversely affecting the above-described deformation characteristics of the thorax, the invention provides a cover releasably mounted to the hollow body which simulates the thorax, which covers over the hollow body and which in certain preferred embodiments comprises a relatively soft, elastically stretchable material. The bag simulating the lungs is disposed between the cover and the thorax. In that arrangement the elastic stretchability of the cover is determined by suitable selection of the stretch properties of the material (for example, am elastomeric material) and by the choice of the wall thickness of the cover. Thus, this configuration determines the inflation resistance of the bag in a manner corresponding to the inflation resistance of the human lungs. In other words, the cover is substantially adapted in shape to the thorax simulation in the closed condition so that the uninflated lungs bag is arranged flat between the thorax and the cover. When effecting artificial respiration by inflation of the lungs bag, the bag lifts the cover, overcoming the stretch resistance thereof, with the thorax also being compressed downwardly to a slight degree. At the end of the respiration blow phase, the lungs bag is emptied again by the resilient return force of the cover.

Typically, the individual participants of an entire training group are usually successively trained on one dummy. Therefore, in addition to the features described above, it is also desirable to provide a CPR dummy which can be used by several individuals in a hygienic manner. In order to avoid the risk of infection, it is already known for those parts of the dummy which, when artificial respiration is being effected, come into contact with the mouth of the person performing the procedure, to be made interchangeable (see European Patent Publication No. A-396 799; U.S. Pat. No. 4,001,950). In addition a non-return exhalation valve provides that the air which is blown into the lungs simulation in a respiration blow does not go back to the mouth opening of the dummy when the lungs simulation is emptied, but is diverted into the open air (such as in the Laerdal 'Resusci Anne'). As the non-return exhalation valve is necessarily arranged in the airway and the trachea simulation must be passed through the mouth or neck opening of the dummy, replacement of lungs simulations with a non-return exhalation valve of that kind is a comparatively difficult and time-consuming operation.

The invention therefore involves the further object of providing a trachea/lungs simulation for a dummy of the kind referred to herein which is of such a configuration that it can be easily replaced when changing to the next person to be trained. The invention further seeks to provide a trachea/lungs simulation of such a simple configuration that it can be thrown away after it has been used once. This object and other objects of the invention are attained by the features of the invention as described herein.

In the trachea/lungs simulation according to the invention, the bag simulating the lungs and the trachea and the non-return exhalation valve represent a unit which is easily interchangeably fixable as a whole in a dummy. In that arrangement the valve housing of the non-return exhalation valve is at the same time the fixing end portion for the trachea simulation in the head of the dummy. As a result, it is easily accessible through the mouth opening of the head. When using the above-mentioned cover and a per se known releasably disposed mandible simulation, it is now a simple matter for the entire trachea/lungs unit, with or without the valve, to be easily removed in a forward direction without the unit having to be drawn through any openings. It is only necessary to open the cover and lift the mandible simulation out of the mouth opening.

BRIEF DESCRIPTION OF THE FIGURES

FIGS. 12b and 12c are perspective views of the valve housing and the filter housing of the modification shown in FIG. 12a;

FIG. 14 is a perspective view of a mechanical sound generator;

FIGS. 15a–15c show three different stages of deformation of the mechanical sound generator shown in FIG. 14; and FIGS. 16a and 16b show a modified embodiment of the lungs bag with a pressure relief duct.

DETAILED DESCRIPTION OF THE PREFERRED EMBODIMENT

Figure 1:
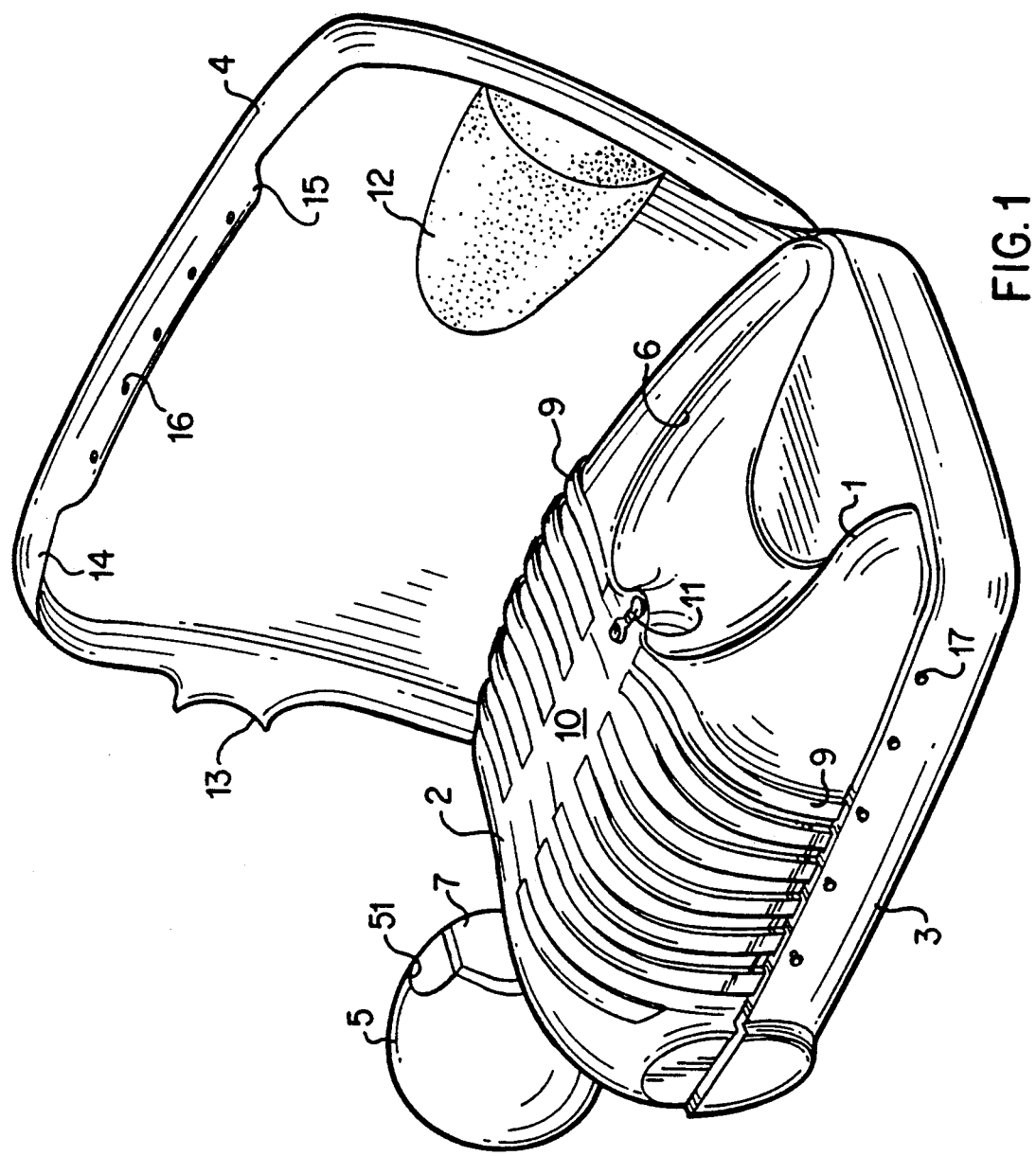
FIG. 1 is a perspective view of a dummy according to the invention with the cover in the opened condition and without the lungs simulation.
Figure 2:
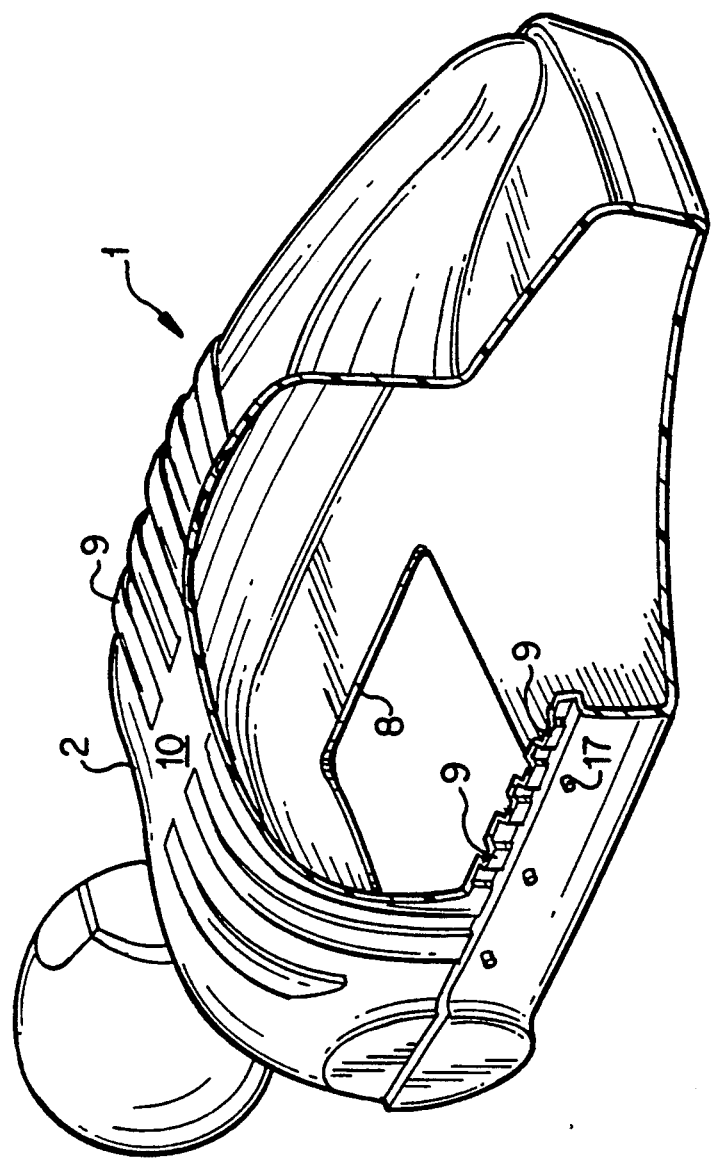
FIG. 2 is a perspective cut-away view of the hollow body simulating the thorax of a dummy.

As shown in the Figures, a preferred embodiment of the dummy according to the invention comprises a hollow body 1 with a hollow body upper portion 2, a hollow body lower portion 3, a cover 4 and a head 5. The hollow body upper portion 2 is substantially a reproduction of a human thorax in terms of its shape and in the region of the stomach portion has an opening 6 which approximately simulates the costal arch. The hollow body lower portion 3 is substantially box-shaped and in its lower wall includes a substantially square opening 8.

The hollow body 1 in the embodiment depicted in FIG. 1 is a one-piece blow molded component, for example of polypropylene, and in the hollow body upper portion 2 has a plurality of stiffening ribs 9 which simulate the human rib cage and which are formed by beads or ridges formed directly in the body in the blow molding operation. In order to substantially reproduce the deformation characteristics of the human rib cage, the depth of the beads or ridges and thus the height of the ribs increases from the thorax center 10 towards the sides. That results in a corresponding flexible stiffness of the ribs 9 in the oppositely disposed side regions of the hollow body upper portion 2 so that the compression characteristics in the central region 10 approximate those of a human thorax. Those compression characteristics are only determined by the mechanical properties of the hollow body upper portion 2 and the ribs 9 provided thereon; as there is a completely free interchange of air with the ambient atmosphere by way of the opening 8, no air pressure which would also be involved in determining the deformation phenomenon can be built up in the hollow body 1 when heart massage is effected.

The cover 4 comprises a relatively soft elastomeric material, for example PVC, which feels similar to the human skin and which accordingly provides the realistic feel of a human upper body. In addition the top side of the cover 4 (not shown in the drawing) is of a configuration having a relief which reproduces at least the costal arch and the sternum, and preferably also the ribs which extend from the sternum. In that way the trainee is given the necessary orientation in terms of the correct position at which heart massage is to be carried out. Fixed to the underside of the cover is a shaped or molded body 12 which is adapted in complementary fashion to the shape of the opening 6 and which comprises a softly yielding resilient material, for example foam. The shaped or molded body 12 can also be replaced by a spring means, for example a leaf spring. A curved neck projection 13 is formed on the cover 4 at the upper edge thereof.

Figure 3B:
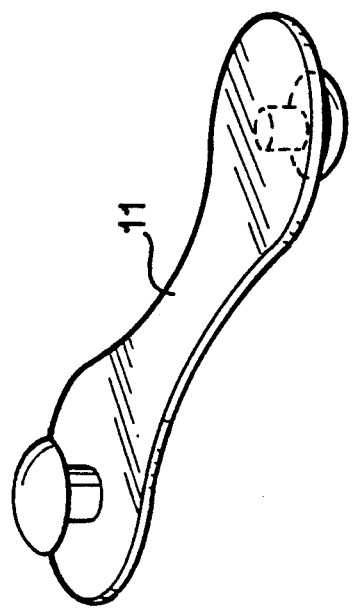
FIGS. 3a and 3b are views corresponding to that shown in FIG. 1 of a dummy according to the invention, without the cover, showing the arrangement of the lungs simulation, or a fixing band for the lungs simulation, on an enlarged scale.

The cover 4 is pivotably fixed on the side of the hollow body 1 by means of a hinge (not shown in FIG. 1), for example a film hinge, while at its opposite edge 14 (which is angled relative to the main surface of the cover 4) it has a fixing projection 15 with a number of holes 16. Corresponding to the holes 16 are projecting pins 17 on the hollow body lower portion 3, which engage into the holes 16 in the closed condition of the cover 4 and hold the cover in close contact with the top side of the hollow body 1 or a lungs bag 20 (see FIG. 3) disposed thereon. Because the cover 4 is made from the relatively soft elastomeric material and because the underside of the cover is substantially adapted in shape to the top side of the body 1 in the region of the ribs 9, the hollow body 1 and the cover 4 (in the closed condition) form a unit which behaves substantially like a unitary body when subjected to a loading force from above, as is applied when a heart massage operation is carried out.

In use, the lungs bag 20 lies flat between the cover 4 and the hollow body 1. In order to secure it in position in relation to tensile forces which can be applied to the lungs bag 20 by movements of the head 5 which are described in greater detail hereinafter, the lungs bag 20 is held to the hollow body 1 by a fixing element 11, namely an elastic band. The elastic band 11 (see FIG. 3b) is provided with a respective stud or knob at one end on the top side and at the other end on the underside. The band 11 is fixed with the knob or stud at the underside, to a projection on the hollow body 1, which simulates the xiphoid process of the sternum; the other knob or stud can be engaged into a hole at the edge of the lungs bag 20. The edge region containing the hole is separated from the interior of the bag by an air-tight seam. If the lungs bag 20 is pulled for example towards the head by the above-mentioned pulling forces in use, the band 11 moves it back into its original position, after the tensile forces cease.

The underneath surface of the hollow body lower portion 3 carries four support elements 18, for example of rubber, which prevent the dummy from slipping on the ground. The hollow body 1 is also provided at its upper end with a neck projection 19 which is formed directly thereon or which is also subsequently fixed thereto, with lateral pins 21 which serve for releasably fixing the head 5, as will be described in greater detail hereinafter. The opening 8 in the hollow body 1 is of sufficient size to be able to dispose the removable head 5 through same, in the interior of the hollow body 1. In that way the amount of space required by the dummy in the course of transportation and the risk of damage to the head can be reduced. In that arrangement the dimensions of the opening 8 are so selected that the head 5 must be pushed into and removed again from the interior of the hollow body 1, with slight elastic deformation of the edges of the opening 8, because that prevents the head from accidentally falling out. The plastic material of the hollow body 1 permits such deformation.

The head 5 comprises a substantially skull-shaped plastic portion having a combined mouth and nose opening 51 and two lateral lug-shaped extensions 52 which each include a round opening 53. The rear side of the head 5 is open between the extensions 52. The head 5 comprises a flexibly elastic plastic material which permits the lateral extensions 52 to be bent apart to such an extent that they can be pushed over the pins 21 of the neck projection 19 on the hollow body 1. The openings 53 are so matched in terms of their diameter to the diameter of the pins 21 that the pins can snap into those openings when the head is pushed on to the neck projection 19. In that way the head 5 is pivotably secured to the hollow body 1 and can be released therefrom by bending the extensions 52 open again.

Provided at each of the oppositely disposed outward sides of the head 5 are projecting knobs or pins 54 which serve for fixing a mask 55 comprising, for example, soft elastomer (indicated by dashed lines in FIG. 5) which simulates the face.

In the interior of the mouth opening 51, at the two oppositely disposed side walls thereof, the head 5 carries projecting pivot and holding pins 56 which serve for releasably fixing and supporting a pivotable mandible 7. The face mask 55 extends beyond the mandible 7 and is also held by same.

Fixed on the top side of the neck projection 19 is an upwardly curved clip 57 whose curved rear co-operates with the mandible 7 upon pivotal movement thereof, together with the head 5, in a manner which is described hereinafter.

Figure 7:
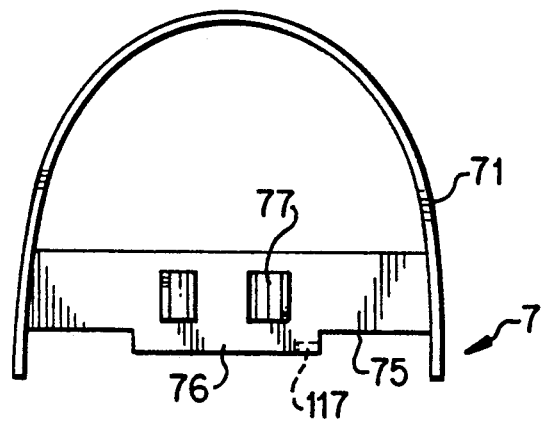
FIGS. 7-9 are a plan view, a rear view and a side view of an interchangeable mandible of a dummy.
Figure 8:
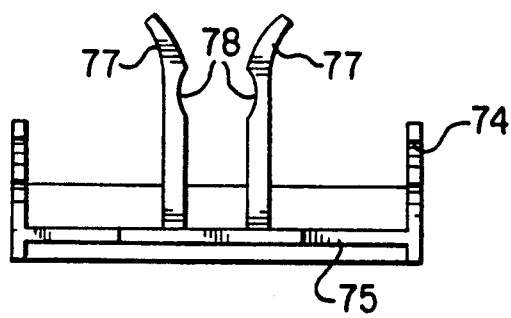
Figure 9:
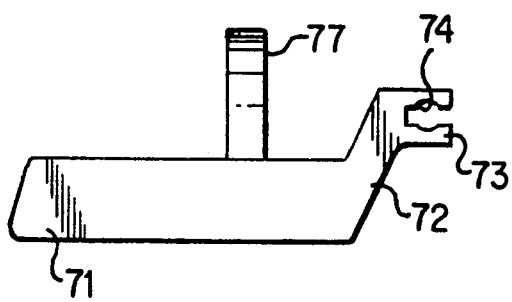

The mandible 7 is shown separately in FIGS. 7–9. It has a substantially horseshoe-shaped jaw portion 71, from each of the rearward ends of which a respective mounting projection 72 extends upwardly in an incline and is of such a configuration as to provide a rearwardly projecting mounting fork 73. The mounting fork 73 forms a mounting opening 74 with a local rounded-out portion, the diameter of which approximately corresponds to the diameter of the mounting pins 56. The jaw portion 71 comprises a flexible elastic plastic material which is elastically deformable to such an extent that it permits the mounting forks 73 to be pressed on to the mounting pins 56 and thus permits the mandible 7 to be fixed to the head 5. The two limbs of the jaw portion 71 are connected together adjacent the mounting projections 72 by a transverse strut 75 which has a rearwardly projecting clamping projection 76. Projecting upwardly from the top side of the transverse strut 75 is a pair of resilient holding arms 77 which have a circular recess 78 at their sides which face towards each other, and together form an elastic holding clip for a trachea/lungs simulation which is to be described in greater detail hereinafter.

Figure 6:
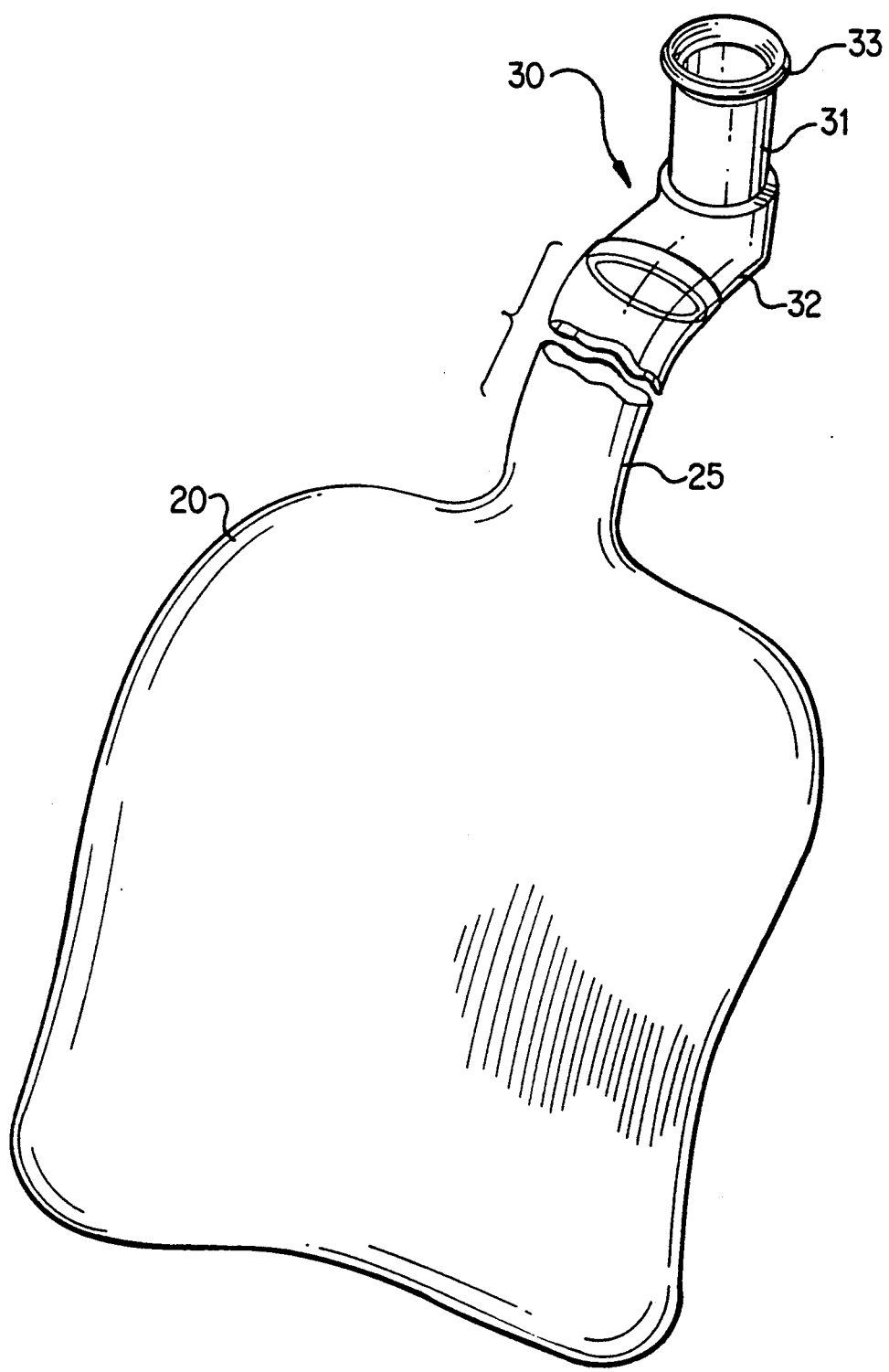
FIG. 6 is a perspective view of a trachea/lungs simulation according to the invention.

FIG. 6 shows the trachea/lungs simulation which forms a self-contained handleable unit and comprises lungs bag 20 as a simulation for the lungs, a trachea simulation 25 which is to be integrally fitted to the bag 20, and a non-return exhalation valve 30. In FIG. 6, the length of the trachea simulation 25 is shown in shortened form. In actual fact the length is sufficient to permit the lungs bag 20 to be laid in the manner shown in FIG. 3 on the flat or shallowly concave topside of the hollow body 1, and provide communication with the non-return exhalation valve which is fixed in the mandible 7. The lungs bag 20 with the trachea 25 comprises a thin air-tight plastic foil. Lungs simulations of that kind are known and for that reason are not described in detail herein.

Figure 10:
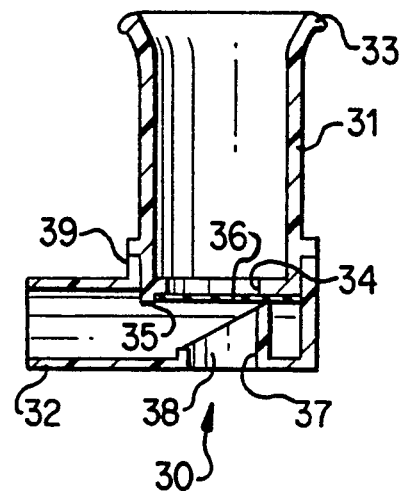
FIG. 10 is a view in axial section through the non-return valve.

In the view shown in FIGS. 6 and 10, the non-return exhalation valve 30 comprises two injection-molded members which are fitted together, namely a connecting portion 31 and a trachea connection 32. The connecting portion 31 and trachea connection 32 can also be formed as a single integral unit. The connecting portion 31 is substantially cylindrical and at the upper end initially flares in a conical configuration and then extends in a flange-like form to provide a holding edge 33. At its lower end the connecting portion 31 has an air inlet opening 34 which at the lower edge forms a first valve seat 35 for a valve diaphragm 36 of silicone rubber.

The trachea connection 32 which is of a shallowly elliptical cross section has its longitudinal axis disposed approximately at a right angle to the longitudinal axis of the connecting portion 31 and has an air outlet opening 37 which is surrounded by a second valve seat 38 which projects into the interior. The valve seat 38 extends at an incline relative to the longitudinal axis of the trachea connection 32 in the manner shown in FIG. 10 so that its sealing plane defines an acute angle with the sealing plane of the first valve seat 35. The valve diaphragm 36 is fixed with a small part of its circular periphery to the rearward end of the first valve seat 35 or to the underside of the connecting portion 31, for example by gluing. The connecting portion 31 and the trachea connection 32 together form a valve housing 39. The trachea simulation 25 is fixedly connected to the front end of the trachea connection 32, for example being glued or heat-sealed thereto.

Figure 5:
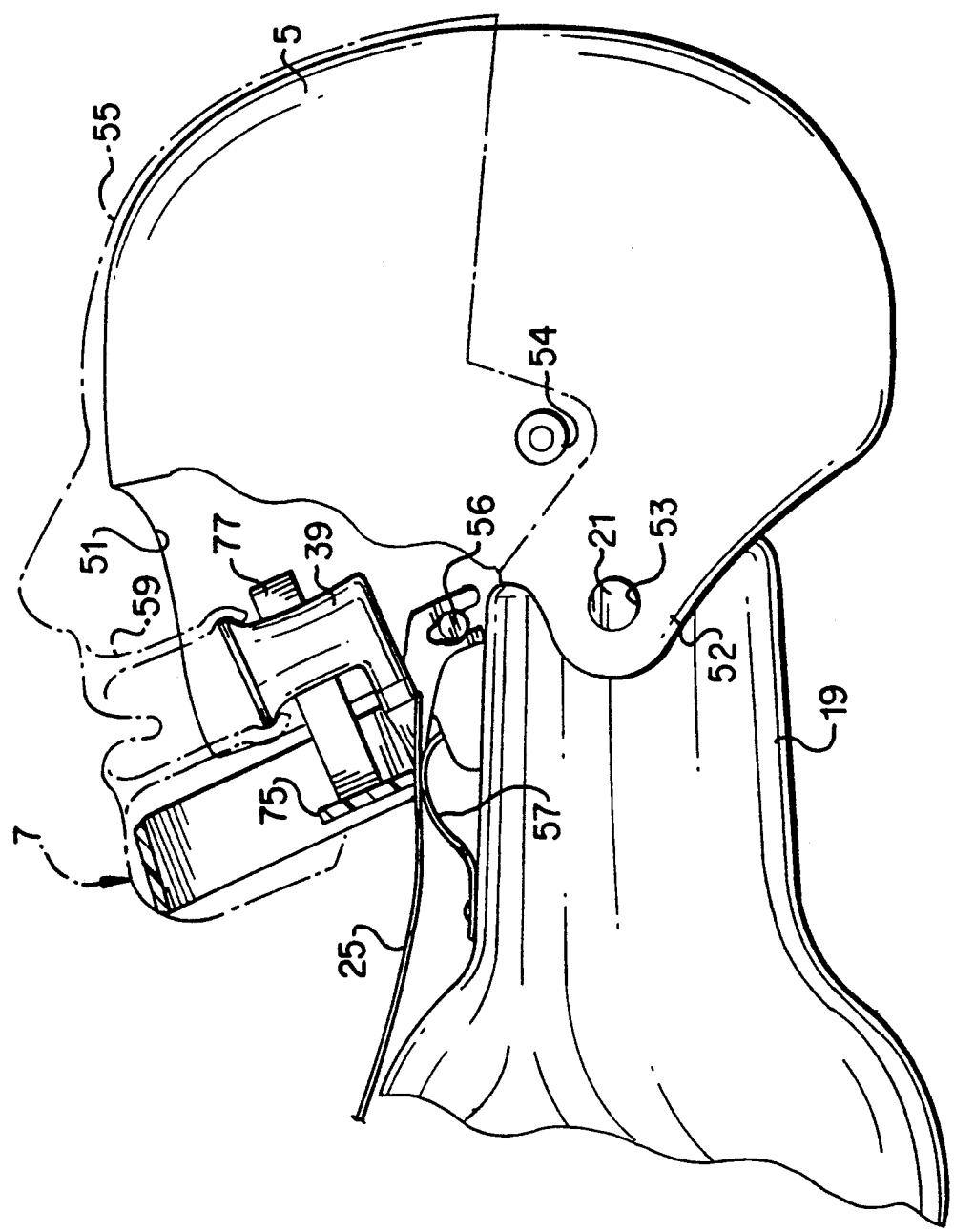
FIG. 5 is a partly broken-way and sectional side view of the head and the neck portion of a dummy of the present invention.

When the dummy is ready for operation, the valve housing 39 is held by the holding clip 77 of the mandible 7 (see FIG. 5). For that purpose the valve housing is pressed into position between the holding arms of the holding clip 77 so that the arms initially elastically yield and then snap into position around the connecting portion 31, with the recesses 78 (see FIG. 8). The mandible 7 is then pushed with the mounting forks 73 on to the mounting pins 56 on the head 5. Lastly the face mask 55 which, in a known manner, has a tubular connection 59 which joins to the inside of the mouth opening is pushed with that connection on to the holding edge 33 of the connecting portion 31. As a result of the elastically yielding nature of the elastomeric material of the face mask 55 and the tubular connection 59 which is formed integrally therewith, the connection 59 is fitted airtightly around the holding edge 33. In that way the valve housing 39 at the same time forms a connecting element for the face mask 55 and a part of its holding arrangement. In the pivotal position of the head 5 relative to the neck projection 19, as shown in FIG. 5, the trachea simulation 25 lies flat on the curved back of the clip 57 and is squeezed together thereon by the clamping projection 76 on the transverse strut 75 of the mandible 7. In that position therefore air cannot be blown into the lungs bag 20, or it can be blown into the lungs bag only against a great deal of resistance. If on the other hand the head 5 is pivoted rearwardly by lifting at the mandible 7, as is also required for artificial respiration for a human being, the clamping projection 76 is pivoted away from the top side of the clip 57 so that the trachea simulation is freely available to carry a flow of air.

Figure 3A:
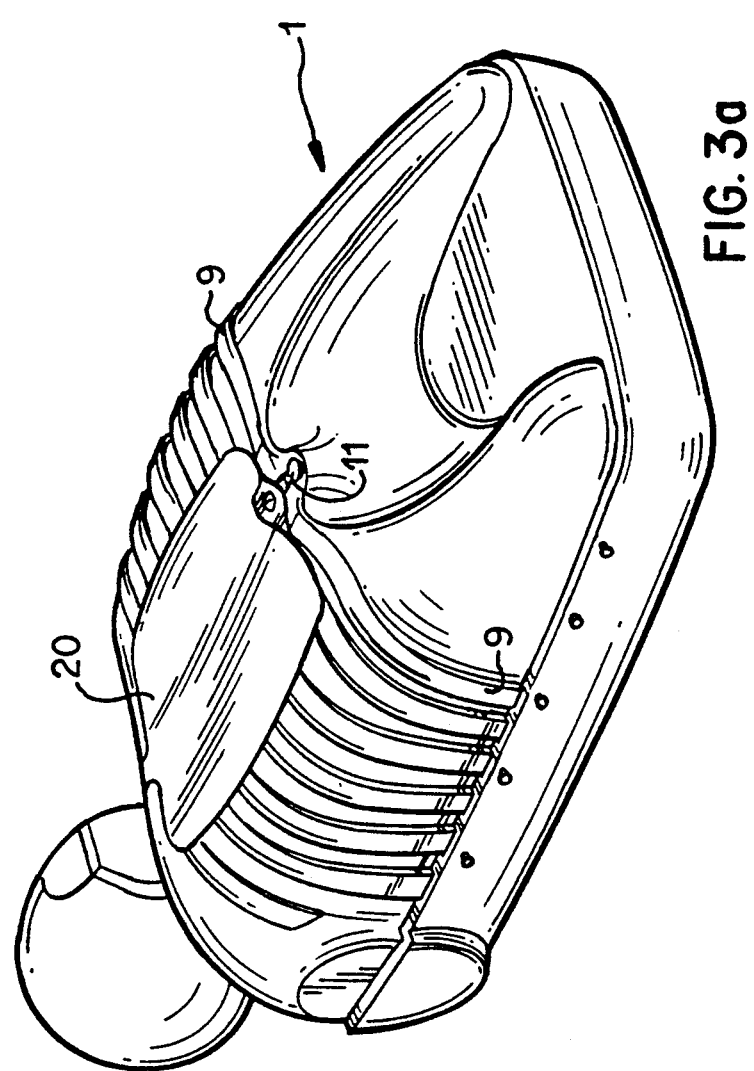
Figure 4:
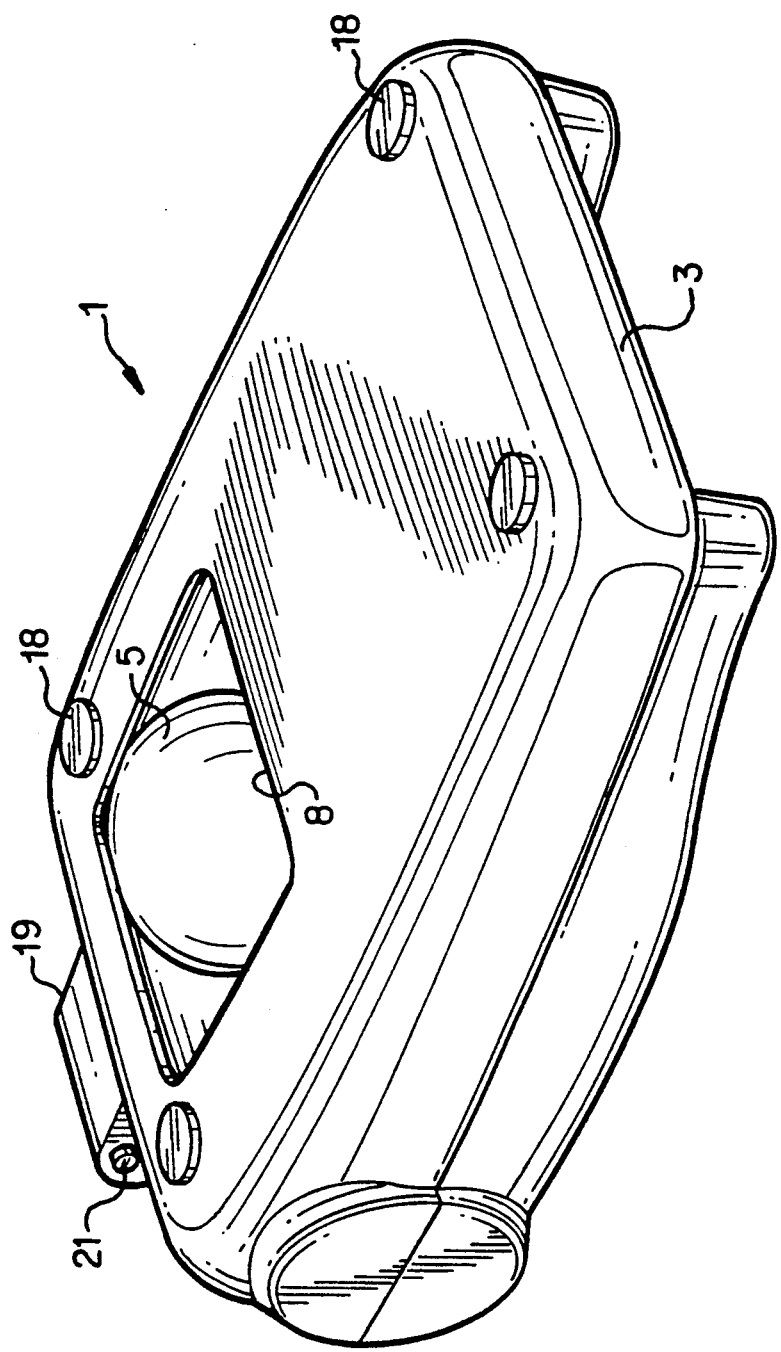
FIG. 4 is a perspective view from below of the hollow body simulating the thorax, without the head.

When the dummy is ready for operation, the lungs bag 20 lies on the hollow body in the manner shown in FIG. 3 and is held thereon by the closed cover 4 which is fixed by means of the holes 16 and the pins 17. In that arrangement the heart message procedure can be practiced on the dummy from the top side of the cover, in which case the relief of the rib and sternum structure, which is to be found on the top side of the cover, gives the trainee the necessary reference point for correct positioning of the hands. If air is blown in through the mouth opening of the face mask 55, in the manner of mouth-to-mouth artificial respiration, it passes into the connecting portion 31 of the non-return exhalation valve 30, lifts the valve diaphragm 36 off the associated valve seat 35, flows through the trachea connection 32 and, when the head 5 is in the correct pivotal position, through the trachea simulation 25 and into the lungs bag 20. In that way the latter is expanded against the elastic resistance of the cover 4 so that the air pressure which is required to inflate the lungs bag 20 corresponds to the natural lungs resistance of a human being. Moreover expansion of the lungs bag 20 causes a lifting movement and expansion of the cover 4, which is clearly visible and in that respect realistic, so that the trainee can check the effectiveness of his mouth-to-mouth resuscitation procedure.

After conclusion of the practice, the face mask 55 is first released from the lateral knobs or pins 55 on the head 5 and pulled off upwardly over the mandible 7, or only the jaw region of the face mask is pulled up over the mandible 7, whereby the tubular connection 59 at the inside thereof is automatically released from the holding edge 33 of the valve housing 39. Thereupon the mandible 7 can be released by being pulled out of the mounting pins 56 so that the valve housing 39 is now freely accessible and can be pulled out of the elastic holding clip 77. Therefore after the cover 4 has been opened, the trachea/lungs simulation as a unit, optionally together with the mandible 7, can be freely removed forwardly and disposed of. The insertion of a new trachea/lungs simulation is effected in the reverse fashion so that the dummy is ready for the next trainee.

In the respiration procedure the non-return exhalation valve 30 acts as an element which prevents the air which is blown into the lungs bag 20 from flowing back into the mouth of the person effecting the resuscitation procedure. That reverse flow is caused by virtue of the fact that, after the end of a respiration blow, that is to say with the resulting drop in pressure in the trachea system, the elastic return force of the cover 4 applies pressure to the lungs bag 20 so that air contained in the latter is pushed out again through the trachea simulation 25. However, with the abatement of the filling pressure, the valve diaphragm 36, which while blowing in is pivoted by the air pressure and pressed on to the second valve seat 38, has moved back on to the first valve seat 35 so that issuing air cannot flow back into the connecting portion 31. Rather, that air flows through the outlet opening 37 which has now been opened, into the interior of the head 5, and passes from same into the open air through the opening at the rear of the head. In the inserted condition of the valve housing 39 the blowing-out opening 37 faces rearwardly so that the trainee is not irritated by any air which issues laterally.

Figure 11:
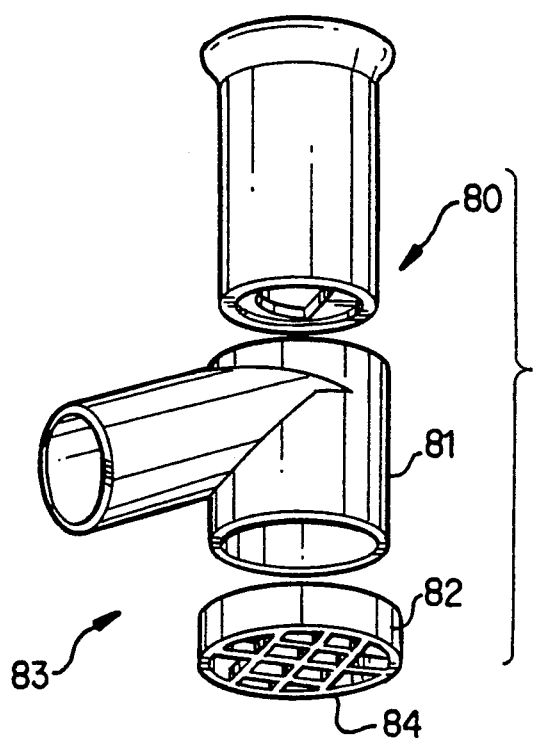
FIG. 11 is a perspective view from below of a modification of the non-return valve in the exploded condition.
Figure 12C:
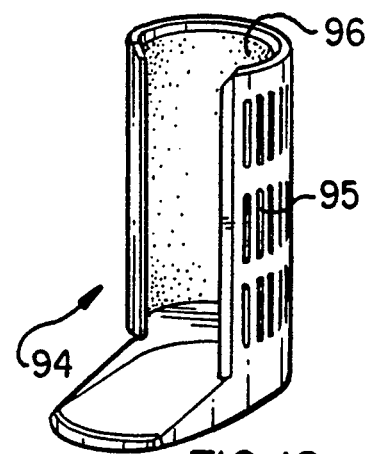

The predominant part of the moisture which passes into the lungs bag 20 with the respiration air condenses on the inside walls of the bag. However, a small part of the moisture can be blown out again upon emptying of the lungs bag 20 and then, under some circumstances depending on the temperature conditions, condenses at the inside wall of the head 5. For reasons of hygiene therefore the head 5 should be cleaned for each new trainee. That can be avoided if use is made of a non-return exhalation valve 80 or 90 as shown in FIG. 11 or FIG. 12, which includes an integrated filter.

The valve 80 is substantially similar in structure to the valve 30 of the above-described embodiment, but around the outlet opening it has an outwardly projecting extension 81 which with a ring 82 which can be fitted thereon forms a filter housing 83. The ring 82 includes a grid or grating 84 on which a moisture filter (not shown) lies and is held by frictional engagement, by suitable dimensioning of its diameter. It can be envisaged that, in order to increase the filter area, the grid or grating 84 may not be arranged with its plane substantially perpendicular, as shown in FIG. 11, but inclined relative to the longitudinal axis of the filter housing. For that purpose, the lower edge of the filter housing 83, like that of the ring 82, may extend at a suitably inclined position relative to the longitudinal axis. Even those design configurations of the valve are so simply that the valve can be thrown away after use and replacement of the filter is not required.

Figure 12B:
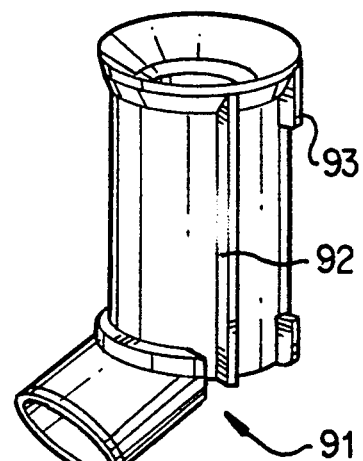
Figure 12A:
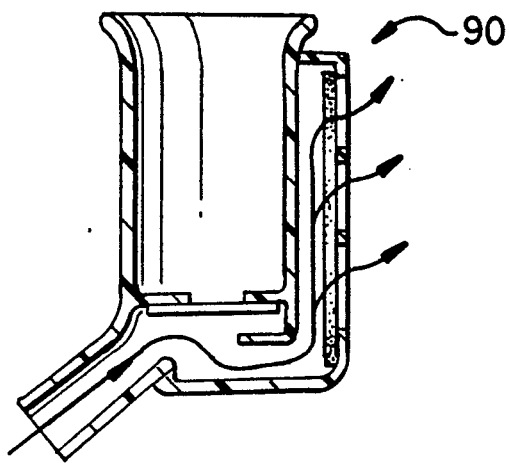
FIG. 12a is a view in axial section through a further modification of the non-return valve.

In the case of the valve 90, provided on the outside of the valve housing 91 are two mutually diametrically oppositely disposed holding limb portions 92 (only one thereof is shown in FIG. 12b) as well as spacer limb portions 93, on to which a filter housing 94 is pushed and held thereon by frictional engagement. The filter housing 94 includes a plurality of outlet openings 95 in front of which a moisture filter 96 is disposed, on the inside thereof. The arrows in FIG. 12a indicate the path of the issuing air.

Figure 13:
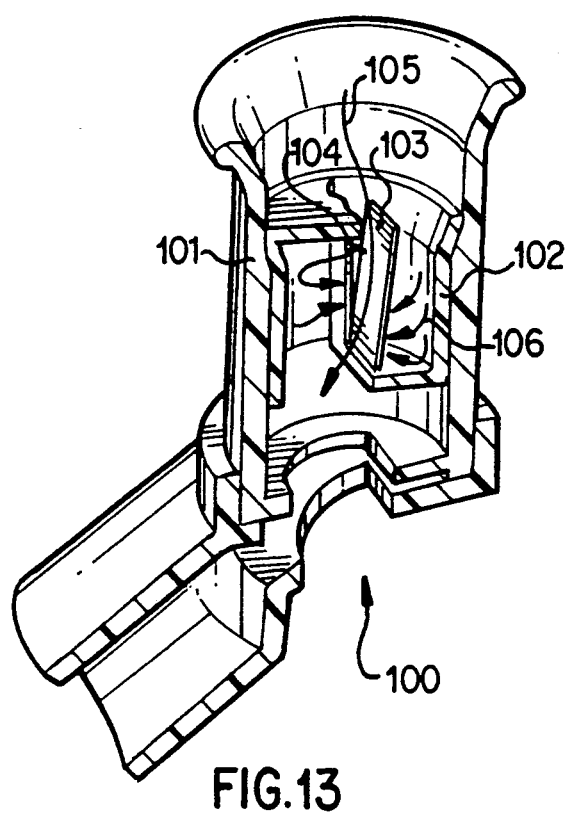
FIG. 13 is a perspective view in longitudinal section of a third modification of the non-return valve.

FIG. 13 shows a valve 100 giving the trainee an advantageous way of monitoring of the correct filling air pressure. For that purpose, releasably disposed in the connecting portion 101 is a whistle casing 102 which contains a resilient whistle plate or reed 103. The whistle reed 103 is disposed approximately parallel to the axis of the connecting portion 101 and leaves free a flow-through opening 104 through which the blown-in air flows smoothly along the line indicated by the arrow 105 if the filling pressure and thus the flow velocity are correct. If however the filling pressure is excessively high, which would correspond to excessively vigorous artificial respiration, that results in an accumulation of air (arrows 106) which prevents the air flowing through the opening 104 and results in vibration of the whistle reed 103. It then produces a whistle sound. It will be appreciated that the whistle reed is set to the correct filling pressure. 'Reed' whistles of that kind are sufficiently known and therefore do not need to be described in greater detail herein.

The hollow body 1 with the opening 8 provided at its underside permits simple mounting of a mechanical sound generator which is shown in FIGS. 11 and 12 and which gives the person practicing the procedure a sound signal for monitoring the activity of that person, during the heart massage operation, at each heart compression. The sound generator in the form of a clicker is a very simple piece of equipment which can be fixed to the inside wall of the hollow body upper portion, by a clamping holding arrangement (not shown), similarly to the holding clip 77 for the valve housing 39. The clicker device which is generally identified by reference numeral 60 essentially comprises a U-shaped loop portion 61 of a resilient plastic material, with a sound box 62 provided on one limb of the U-shape. From the sound box 62 a projection 63 projects upwardly, with a tooth 64. A pressing pin or plunger 65 is fixed on the other limb of the U-shape. The clicker device 60 is fixed with the limb of the U-shape which carries the sound box, to the inside wall of the hollow body upper portion 2, in the above-discussed manner, so that the pressing pin or plunger 65 is directed downwardly. It will be appreciated that the length of the pressing pin or plunger 65 is such that, upon correct heart compression, it comes into contact with the ground on which the dummy is lying and in that situation the clicker device 60 is subjected to a deformation effect which can be seen from FIG. 12b. As a result of that deformation, the free end of the limb of the U-shape which carries the pressing pin 65 hits against the sound box 62 and thereby produces a clearly perceptible clicking noise. The possibility of further deformation, as indicated in FIG. 12c, ensures that the clicker device is not damaged in the event of excessive heart compression.

Instead of the embodiment of a clicker device as described herein, it will be appreciated that other known configurations of mechanical sound generators may also be used, which are of a very simple nature and which thereby do not involve substantial expenditure on the dummy. By virtue of the fact that, at each sufficiently deep heart compression, the trainee perceives a noise which is produced by the sound generator, that assists him in adjustment to a given compression rhythm without his having to observe optical devices, for example lamps or LCDs which light up, for that purpose.

The modified embodiment of a lungs bag shown in FIG. 16 includes a precautionary measure which is intended to prevent the lungs bag from bursting or splitting when pressure is applied thereto. That can occur when the trainee turns very quickly to heart massage after having administered a number of artificial respiration blows and the lungs bag is not yet completely empty at that time. In order to prevent that from happening, the lungs bag 110 has a trachea simulation 111 whose actual air feed cross-section 112, starting from a somewhat enlarged connection end 113, is defined on one side by a parallel longitudinal sealing seam 114 which extends within the trachea simulation. On the other side the sealing seam 114 defines a relief duct 115 of small cross-section which opens into the open air at the arrow 116.

If air issuing from the relief duct 115 is to be prevented from passing into the interior of the head 5 and if moisture contained in the air is to be prevented from condensing in the head, the sealing seam 114a can be moved into the interior of the air feed cross-section of the trachea simulation, as shown in FIG. 16b. The relief duct 115a which is formed in that way opens into the connecting end 113a so that the air issuing therefrom flows into the non-return exhalation valve 80 or 90 connected thereto and gives off to the filter thereof the moisture contained in the air.

As, when a heart massage procedure is being carried out, the head 5 is released by the trainee, the head 5 moves back under the effect of a spring means (not shown) from the rearwardly pivoted respiration position (which corresponds to the correct head attitude when applying artificial respiration to a human being) into the pivot position shown in FIG. 5. As in that position the head clamping projection 76 shuts off the trachea simulation, the relief duct 115 or 115a is kept free by a cut-out portion 117 in the clamping projection, as shown in broken line in FIG. 7. The cross-section of the relief duct is so small that, in the wrong pivot position of the head, it produces a resistance to blowing in which the trainee can clearly feel.

A still simpler solution which provides for pressure relief into the interior of the valve 80 or 90 provides that a cut-out portion or a notch 117 is provided only in the clamping projection 76, but the arrangement does not have a relief duct which is separated by a separate sealing seam 114 or 114a. In that case the cut-out portion 117 can be disposed at any position on the edge of the clamping projection 76, for example centrally thereof. The part of the width of the trachea simulation 25, which is kept free by virtue of the Cut-out portion 117, acts in the clamping position of the mandible 7 as a throttle location, the flow-through resistance of which signals to the trainee that the head is in the wrong pivot position. At the same time however that part affords a sufficient flow-through capability for relieving the lungs bag of excess pressure.

What is claimed is:

1. A dummy for practicing cardiopulmonary resuscitation (CPR) of a human being, comprising a simulation of the thorax and the head, wherein the thorax simulation is formed by a hollow body of plastic material, which is in air exchange relationship with the atmosphere and which is of a wall thickness which is so selected that the compressibility and return force of the thorax simulation correspond to those of a human thorax, and further comprising a cover formed of an elastically deformable material which covers the hollow body and which is releasably mounted to the hollow body, wherein the elasticity of the cover determines the inflation resistance of the bag to approximate the inflation resistance of the human lungs, wherein the hollow body has a stomach portion in the form of a depression which with its ribcage simulates the costal arch, and wherein a spring element which can be inserted into the depression is fixed to the underside of the cover or into the depression.

2. A dummy as set forth in claim 1 wherein the spring element is a body of softly yielding material which is adapted in shape to the depression.

* * * * *